March 9, 1926.  
F. HAHN  
1,576,118  
COLOR PHOTOGRAPHY  
Filed March 1, 1921  
4 Sheets-Sheet 1
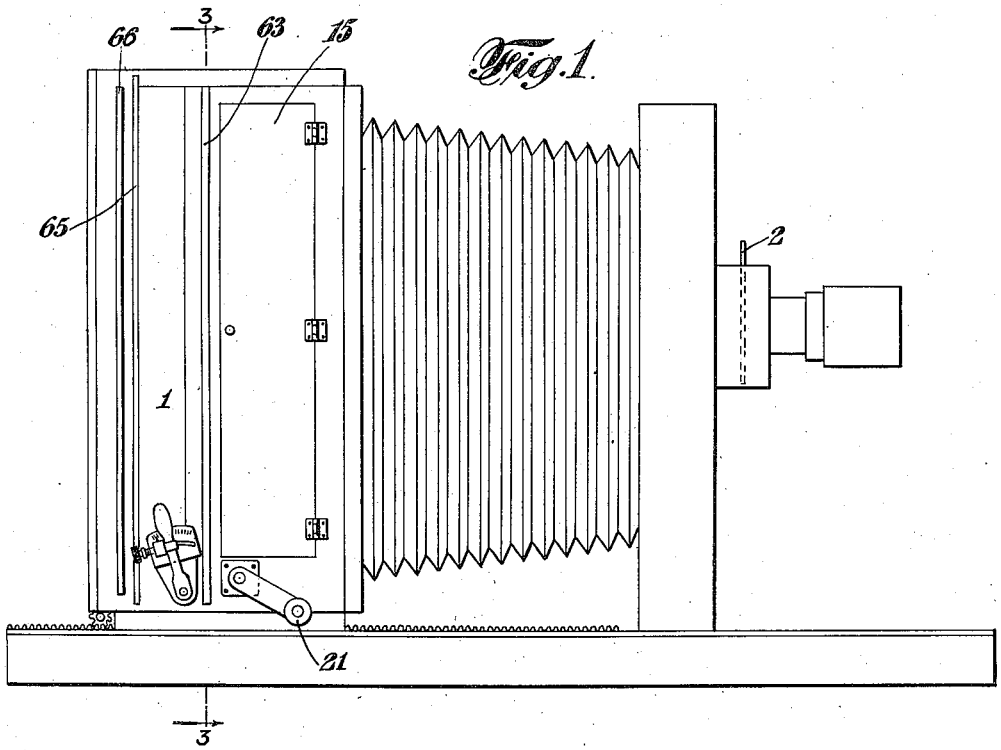
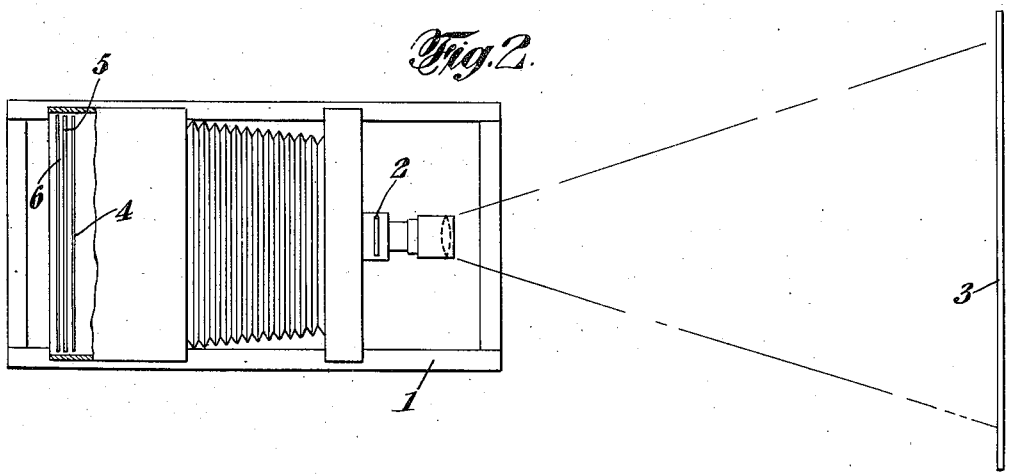
Francis Hahn INVENTOR
BY Kenyon & Kenyon ATTORNEYS March 9, 1926.　　　　　　　　　　　　　　1,576,118
F. HAHN
COLOR PHOTOGRAPHY
Filed March 1, 1921　　　4 Sheets-Sheet 2
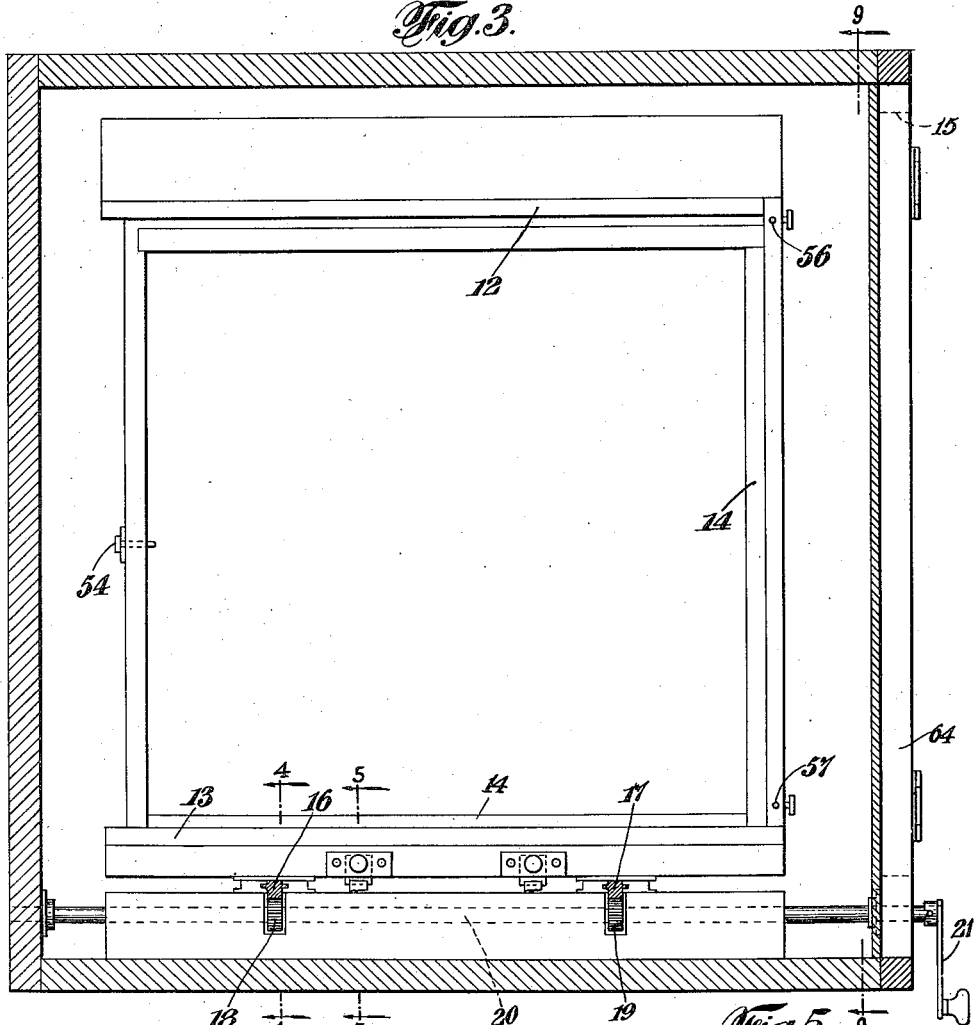
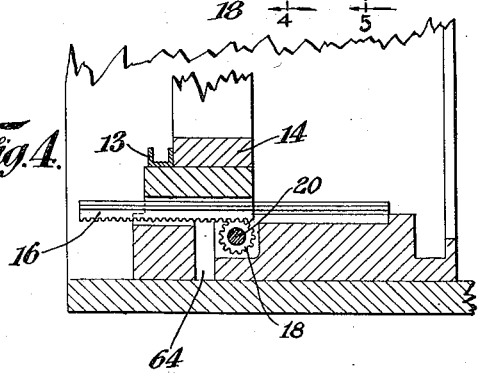
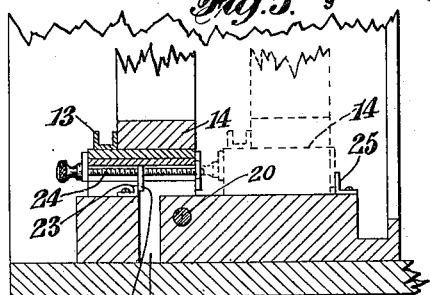
INVENTOR
Francis Hahn
BY
Kenyon & Kenyon
ATTORNEYS

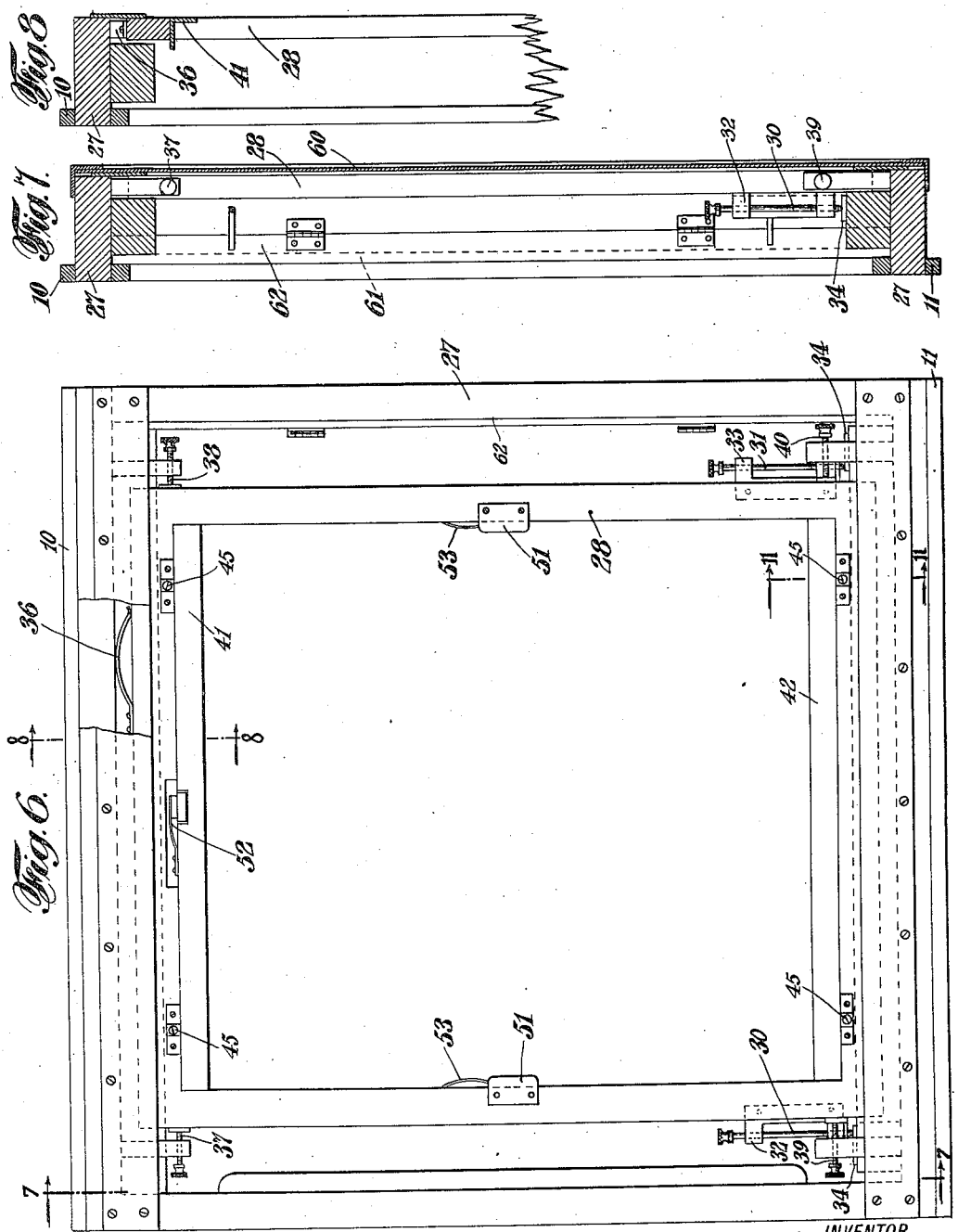

March 9, 1926.  1,576,118
F. HAHN
COLOR PHOTOGRAPHY
Filed March 1, 1921   4 Sheets-Sheet 4
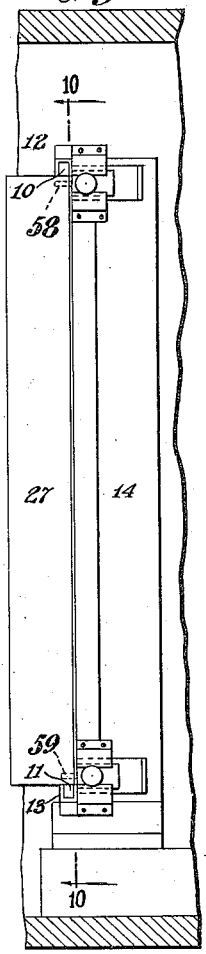
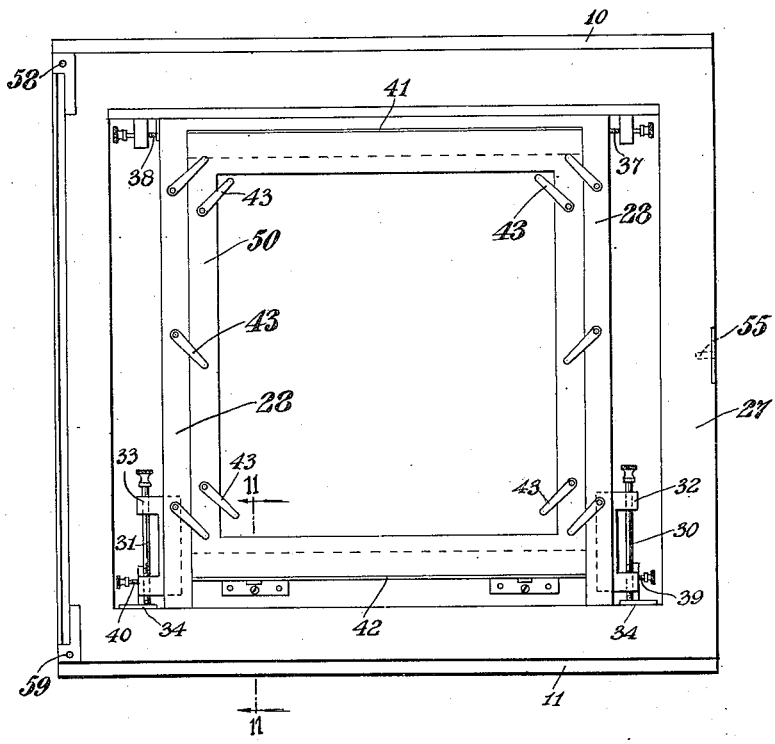
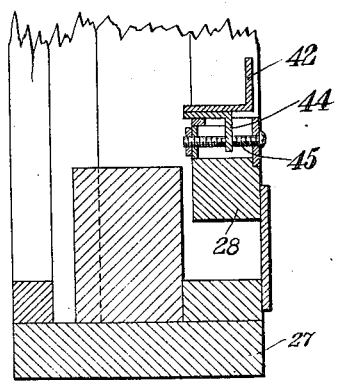
INVENTOR
Francis Hahn
BY
Kenyon & Kenyon
ATTORNEYS Patented Mar. 9, 1926.

1,576,118

UNITED STATES PATENT OFFICE.

FRANCIS HAHN, OF BERGENFIELD, NEW JERSEY, ASSIGNOR, BY MESNE ASSIGNMENTS, TO REPRO-ART MACHINERY CO., A COPARTNERSHIP CONSISTING OF HOWARD S. LEVY AND LIONEL F. LEVY.

COLOR PHOTOGRAPHY.

Application filed March 1, 1921. Serial No. 448,895.

*To all whom it may concern:*

Be it known that I, FRANCIS HAHN, a citizen of Austria, residing in Bergenfield, county of Bergen, State of New Jersey, have invented certain new and useful Improvements in Color Photography, of which the following is a specification.

My invention relates to photography and more particularly to that branch of color photography connected with the art of printing reproductions of a picture or other object in its natural colors. In ordinary processes of this character generally used, the proper relative effect of the different intensities of illumination at different portions of the picture or object photographed is not obtained on the negatives corresponding to certain colors (that corresponding to the red pigment, for example), an exposure which is sufficient to properly bring out the high lights being entirely insufficient to give to the remainder of the picture the proper relative value. The printing surface produced from the negative accordingly needs a considerable amount of expensive manual retouching to bring out the proper relative values.

The principal object of my invention is to minimize this manual retouching. I accomplish this by an improved process and apparatus whereby better relative values are obtainable on the negative. In carrying out this process, rays from the higher lights are intercepted during a suitable portion of the exposure while the remainder of the rays corresponding to the particular printing plate act upon the negative. Preferably the former rays are intercepted during a part only of the exposure, there being another portion of the exposure without intercepting such rays to obtain the proper elative effect of the light rays on the negative. To intercept the light rays I preferably employ a negative of the picture or object photographed. In my improved apparatus for carrying out the process, the exposure for producing this negative as well as the exposure to produce the printing plate negative are made in the same camera. The latter contains various novel features whereby the process may be easily and efficiently carried out.

In order that the invention may be more clearly understood attention is hereby directed to the following detailed description setting forth one way of carrying out my invention and to the accompanying drawings, forming a part of this specification and illustrating one embodiment of the invention.

Referring to the drawings,

Fig. 1 is a side elevation of a camera embodying the invention.

Fig. 2 is a diagrammatic plan view illustrating the practice of the invention.

Fig. 3 is a section taken on line 3—3 of Fig. 1, certain of the parts such as the lens and bellows being omitted for convenience in illustration.

Fig. 4 is a section taken on line 4—4 of Fig. 3.

Fig. 5 is a section taken on line 5—5 of Fig. 3.

Fig. 6 is an elevation partly broken away of the holder for the light intercepting negative or the sensitized plate from which the said negative is made.

Fig. 7 is a cross section taken on line 7—7 of Fig. 6.

Fig. 8 is a section taken on line 8—8 of Fig. 6.

Fig. 9 is a view partly in elevation and partly in section taken on line 9—9 of Fig. 3.

Fig. 10 is an elevational view on line 10—10 of Fig. 9.

Fig. 11 is a section taken on line 11—11 of Fig. 6.

Referring to Fig. 2, I shall describe one manner of practicing my process in connection with the three color photography processes for printing surfaces. In this process it is customary to make plates corresponding respectively to the red, yellow and blue pigments. I shall first refer to the making of the negative for the red printing plate. To do this, I place in the camera 1 a red filter 2 and photograph the picture 3 or other object upon a member such as the plate 4 carrying a suitable sensitized photographic emulsion. This plate is then removed from the camera and developed to produce the light intercepting negative in which the portions corresponding to the high lights and red color will be dark or opaque while the remaining portions will be more or less transparent. A half-tone screen 5 and a plate 6, bearing a suitable sensitized photographic emulsion, are arranged in the camera to the rear of the negative 4, the latter being reinserted into the position occupied by the plate from which it was made during the exposure thereon. The negative 4 will be as near as possible to the plate 6 and the intervening half-tone screen 5, the plate 6 being at the proper focusing distance to the rear of the lens and the portion of the camera for supporting the filter 2. A green filter having been substituted in the camera for the filter 2, the picture 3 or other object is now photographed through the said filter, the negative 4 and the screen 5 upon the plate 6. During this exposure, the negative 4 by intercepting selected rays which have passed through the color filter, and which correspond to the high lights of the picture or object photographed, will improve the relative effect produced by the light rays upon various portions of the plate 6. After an exposure in this manner for a suitable length of time, the negative 4 is removed from the camera and the exposure continued for a suitable length of time. In practice the time of exposure with and without the negative 4 may conveniently be about equal. The result of the combined exposure as described will be that the action on the plate 6 without the negative 4 will be augmented by an exposure in which the portions of the photographic plate not otherwise sufficiently affected are acted upon by the rays from the picture or object to a sufficient extent to bring them out clearly in the photographic negative thus produced. If desired, the order of exposure upon the p'ate 6 may be reversed, the exposure being first made without the negative 4 and later with the same. The picture 3 or other object may be illuminated during exposure either by daylight or by artificial light. The printing plate may be made from the plate 6 after it has been developed in any suitable way.

For making the negative corresponding to the yellow printing plate the procedure will be the same as described above except for the use of the proper filters at the point 2 in the camera. For the yellow plate a green filter is used in making the light intercepting negative; and no filter, or a plain white transparent member such as a body of water, is used in making the exposure upon the plate 6. For the negative corresponding to the blue printing plate, a satisfactory exposure may be made without the additional exposure with the light intercepting member or negative 4, the exposure being made with a red filter.

For best results it is desirable to produce a black printing plate. In producing the negative for this plate I first expose the sensitive plate through a green filter and a light intercepting negative such as used in producing the red printing plate negative. I then further expose the sensitive plate through a red filter, but without the light intercepting negative for a suitable length of time. Of course the order of exposure may be changed as desired. By properly timing the relative exposures I am able thus to obtain a negative in which the effect of the various colors is eliminated, the negative being transparent at the positions corresponding to the black portions of the picture or object photographed and containing no variations of shade due to the different actinic effects of the various colors. I know of no other process by which such a negative can be obtained.

Figs. 6, 7, 8, 10 and 11 illustrate the holder which I prefer to employ for the negative 4 or the sensitized plate from which the said negative is made. As shown in Fig. 7, this frame is provided at the top and bottom with guide strips 10 and 11 respectively which are adapted to slide in upper and lower open-ended transverse guide channels 12 and 13 respectively (Figs. 3, 4 and 5) on a frame 14 mounted within the camera. This plate supporting frame is accordingly adapted to be moved laterally into and out of the camera. As shown in Fig. 1, the camera is provided with a door 15 for closing the opening through which said plate holder may be inserted or withdrawn. As hereinbefore stated, the negative 4 should in its operative position be supported close to the screen 5 and plate 6.

As it would be undesirable to attempt to withdraw the plate holder from the camera by direct lateral movement thereof from its operative position, I have mounted the frame 14 which supports the plate holder for movement longitudinally, or backward and forward, of the camera. Referring to Figs. 3 and 4, the frame 14 is provided at the bottom with racks 16 and 17 which are respectively engaged by pinions 18 and 19 secured to a shaft 20 which is adapted to be rotated by the handle 21 at the outer end of the shaft. In order to insure the proper operative positioning of the frame 14 upon rotation of the handle 21, I have provided the said frame with a member 22 which is adapted to bear against a fixed stop 23 in the camera when the frame 14 is in operative position. Means are desirably provided to permit adjustment of the operative position of the frame 14, such as the screw 24 rotatably mounted in the frame 14 and threaded through the member 22. The forward movement of the frame 14 may be limited as by the fixed stop 25 carried by the camera, so as to facilitate positioning the frame 14 for ready removal of the plate holder through the opening provided therefor in the side of the camera. Fig. 5 shows the frame 14 in operative position in solid lines and in inoperative position in dotted lines.

When the negative 4 is inserted in the camera for interception of light during the exposure upon the plate 6, it must be brought accurately to register with the picture 3 or other object photographed. This will generally require a slight re-adjustment of the position of the negative in the plate holder.

Referring to Figs. 6, 7 and 10, the plate holder comprises an outer frame 27 upon which a frame 28 is supported for movement up and down as well as laterally. For adjusting the frame 28 vertically, I have shown screws 30 and 31 threaded respectively into brackets 32 and 33 carried by the frame 28 and resting at their lower ends on bearing plates 34 and 35 respectively upon the outer frame 27. The frame 28 is desirably yieldingly pressed downwardly as by springs 36. For adjusting the frame 28 laterally I have shown adjustment screws 37, 38, 39 and 40 threaded through brackets supported upon the frame 27 and bearing at their inner ends upon suitable bearing plates upon the opposite side edges of the frame 28.

As shown in Figs. 6, 8 and 11, the negative 4 and the sensitized plate from which the said negative is formed are adapted to be supported directly in the frame 28.

Referring to Figs. 8 and 11, the negative 4 or the sensitized plate from which the said negative is formed, is adapted to be supported by angular strips 41 and 42 carried by the frame 28. The plate may be held against the vertical flanges of these strips by suitable spring clips, such as shown at 43 in Fig. 10. The strips 41 and 42 have affixed thereto, as shown in Fig. 11, projections 44 through which are threaded screws 45 rotatably mounted in brackets carried by the frame 28. By reason of this threaded connection between the frame 28 and the plate supporting strips 41 and 42, the plate is adapted to be adjusted forwardly and rearwardly for fine adjustment of the position thereof. Adjusting means of the kind described are provided as shown in Fig. 6 adjacent each of the corners of the plate or negative holder so that one portion of the plate may be adjusted forwardly or rearwardly independent of the others, if this should be necessary to bring the negative into register with the picture or object photographed.

In Fig. 10 I have shown the frame 28 provided with another frame 50 nested therein. This arrangement will be useful when a negative or plate 4 of small size is used. The inner frame 50 may be held in position in the frame 28 by the spring clips 43 which press the inner frame against plates 51 (see Fig. 6) upon the frame 28. The spring clips 52 and the springs 53 shown in Fig. 6 serve to hold the plate or negative 4 or the inner frame 50 in position in the frame 28.

In order to insure the accurate positioning of the plate holder in the frame 14 in the camera, I have provided the said frame with a laterally movable pin 54 (Fig. 3) which is movable into and out of an opening 55 (Fig. 10) of the same cross section in the frame 27 and also with pins 56 and 57 which are movable backwardly and forwardly into openings 58 and 59 respectively of the same cross section in the frame 27 (see Fig. 9). The pin 54 is, as shown, arranged along one side of the frame 14 and the pins 56 and 57 at the top and bottom respectively of the opposite side of the said frame.

In order to permit the insertion of the sensitized plate 4 into the camera or its removal therefrom while the picture 3 or other object remains illuminated, the plate holder is provided with light-proof closures or shutters 60 and 61 respectively (see Fig. 7). These shutters are adapted to be slid laterally out of the plate holder when desired. In practice the plate holder with both of the shutters or closures 60 and 61 in position is placed in the camera with the sensitive plate therein, the forward shutter or closure 61 being removed to make the exposure upon the plate 4. After this the closure 61 is again placed in position and the plate holder removed for the development of the plate. The plate holder may be provided with spring pressed door 62 which normally remains closed but is adapted to be moved to open position by the shutter upon the insertion thereof.

During the exposure on the plate 6 both of the closures or shutters 60 and 61 are of course removed. To prevent the plate 6 from being light-struck during the insertion or removal of the plate holder for the negative 4, I have provided a shutter 63 (see Fig. 1) which is adapted to be placed between the plate holder and the screen 5 when the plate holder is in its forward position. Figs. 4 and 5 show the lower groove 64 in which the shutter 63 slides. As shown by the dotted line position of the frame 14 in Fig. 5, this groove is unobstructed to permit the insertion of the shutter 63 when the frame 14 is in its forward position.

After the shutter 63 has been inserted, the door 15 may be opened, the negative removed, the door 15 again closed whereupon the shutter 63 may be withdrawn to permit the final exposure of the plate 6. The holder for the plate 6 is shown at 65 in Fig. 1. A removable shutter 65 is arranged to the rear of the same.

Among the advantages of my invention are the following: The invention is applicable to the taking of photographs of objects of three dimensions as well as of pictures. It may be practiced either in daylight or artificial light. The printing plate negatives may be made in half tone directly by the original exposure thereon. The method of the invention is simple in practice and results in the saving of both time and labor, producing at the same time a very superior product.

While I have described certain details in connection with the carrying out of the invention, I wish it to be understood that I am not limited to these details.

Having thus described my invention, what I claim and desire to secure by Letters Patent is:

1. A camera having a lens, means for supporting a light sensitive medium in operative relation to the lens, and a member supported intermediate the lens and first-named supporting means for intercepting rays corresponding to high lights and to certain colors but permitting other rays to pass therethrough.

2. A camera having a lens, means for supporting a light sensitive medium in operative relation to the lens, and a member removably supported intermediate the said lens and supporting means and immediately adjacent the latter for intercepting light rays corresponding to the high lights but permitting other rays to pass therethrough.

3. A camera having a lens, means for supporting a light sensitive medium in operative relation to the lens, and a holder for a plate removably supported intermediate the said lens and supporting means, said holder being provided at the front and rear thereof with light excluding closures movable to open or closed positions.

4. A camera having a lens, means for supporting a light sensitive medium in operative relation to the lens, a holder for a plate, and means supporting the holder removably intermediate the lens and first-named supporting means, said holder supporting means being movable backwardly and forwardly to place the holder into or out of operative position.

5. A camera having a lens, means for supporting a light sensitive medium in operative relation to the lens, a holder for a plate, means supporting the holder removably intermediate the lens and first-named supporting means, said holder supporting means being movable backwardly and forwardly to place the holder into or out of operative position, and means for adjusting the position of a plate relatively to the holder supporting means.

6. A camera having a lens, means for supporting a light sensitive medium in operative relation to the lens, a holder for a plate, means supporting the holder removably intermediate the lens and first-named supporting means, said holder supporting means being movable backwardly and forwardly to place the holder into or out of operative position, and means for adjusting the position of a plate vertically and horizontally.

7. A camera having a lens, means for supporting a light sensitive medium in operative relation to the lens, a holder for a plate, means supporting the holder removably intermediate the lens and first-named supporting means, said holder supporting means being movable backwardly and forwardly to place the holder into or out of operative position, and means for adjusting one portion of the plate in a fore and aft direction independently of other portions thereof.

8. A camera having a lens, means for supporting a sensitive plate in operative relation to the lens, means for holding a plate intermediate said lens and said supporting means including a member movable to place the plate into or out of operative position, and means for positively determining the operative position of said holding means.

9. A camera having a lens, means for supporting a sensitive plate in operative relation to the lens, means for holding a plate intermediate said lens and said supporting means including a member movable to place the plate into or out of operative position, and adjustable means for positively determining the operative position of said holding means.

10. A camera having a lens, means for supporting a sensitive plate in operative relation to the lens, a holder for a plate having at the front and rear thereof light excluding closures movable to open or closed positions, means for supporting said holder between said lens and first named supporting means while permitting removal of the holder from the camera, means for moving said holder supporting means backwardly or forwardly to permit placing the holder in proximity to said first-named holding means or to move the holder from said position for convenience of removal thereof from the camera, and means for determining the operative positions of the holder supporting means and holder and for adjusting the plate or the like relatively to the holder.

11. A camera having a lens, means for supporting a sensitive plate in operative relation to the lens, a holder for a plate having at the front and rear thereof light excluding closures movable to open or closed positions, means for supporting said holder between said lens and first-named supporting means while permitting removal of the holder from the camera, and means for moving said holder supporting means backwardly or forwardly to permit placing the holder in proximity to said first-named holding means or to move the holder from the said position for convenience of removal thereof from the camera.

12. A camera having a lens, means for supporting a light sensitive medium in operative relation to the lens, and a holder for a plate removably supported intermediate the said lens and supporting means, said holder comprising a plurality of nested frames whereby plates of different sizes may be supported thereby.

In testimony whereof, I have signed my name to this specification.

FRANCIS HAHN.